3,326,767
AVIAN LEUKOSIS TREATMENT WITH INACTIVATED ROUS SARCOMA VIRUS
Jacob C. Holper, Waukegan, Ill., and Edward M. Kiggins, Kenosha, Wis., assignors to Abbott Laboratories, North Chicago, Ill., a corporation of Illinois
No Drawing. Filed Mar. 21, 1966, Ser. No. 535,682
1 Claim. (Cl. 167—78)

This application is a continuation-in-part of U.S. application Ser. No. 290,186, filed June 24, 1963, now abandoned which is a continuation-in-part of U.S. application Ser. No. 167,409, now abandoned, filed Jan. 19, 1962.

This invention relates to avian disease control, vaccines and methods of vaccine preparation. In particular, the invention is concerned with methods and vaccines for controlling the Avian Leukosis Complex.

The term Avian Leukosis Complex is applied to a variety of neoplastic entities which were among the first recognized members of the presently known virus-induced animal tumors. At the persent time leukosis is a leading animal health problem and economic hazard associated with poultry production. It has been authoritatively estimated that several million mature chickens die from this disease each year. The condition is of major concern to poultry breeders and egg producers because the disease process is of long duration, with gross manifestations often occurring after sexual maturity.

Pathological manifestations of major economic importance include tumorous accumulations of lymphoid cells in various parts of the body. Visceral lymphomatosis, responsible for a majority of deaths caused by the disease complex, is found in economically important birds including chickens, turkeys, ducks, geese, and pheasants.

Causative agents of this disease complex are believed to be viruses. The behavior and rapid spread of the complex suggests it is contagious and possibly caused by a single infectious agent. It is normal to find various forms of the disease in a single flock and to find individual birds with combinations of the disease forms.

Heretofore it has been impractical to devise vaccines and methods of control because of the prolonged time interval required for development of avian leukosis tumor tissue. For example, developing and obtaining RPL 12 tumor tissue, which has been considered for the control of viral diseases in poultry, requires a time interval of about nine months. Additionally, the use of RPL 12 tumorous tissue for such control is not completely satisfactory.

It is therefore desirable and an important object of this invention to provide an antigenic biological which is capable of educing lasting immunity to avian leukosis when administered to poultry. Another object of the invention is the provision of a vaccine capable of evoking an immuity to leukosis. Other objects and advantages will appear in the following specification.

Accordingly, it has been discovered that a useful vaccne capable of educing antigenicity against avian leukosis may be prepared by suspending inactivated Rous sarcoma virus and tumorous tissue in a suitable medium.

Rous sarcoma virus has been comprehensively studied during the fifty years since its discovery. An assay technique for Rous sarcoma is reported at Brit. J. Exptl. Med., 99:183. Moloney, J. Nat. Cancer Inst., 16:877, has reported development of standard lots of the virus for use in quantitative investigation.

In broad terms one embodiment of this invention is carried out as follows: Rous sarcoma virus is injected into poultry tissue and allowed to develop tumors; the tumors are collected and thoroughly ground, dispersed, and suspended in a suitable fluid medium; fluid is separated from the tissue pulp; and the virus-containing fluid is inactivated. Poultry tissue is taken to mean various tissues of poultry origin such as living poultry, poultry eggs and isolated tissue.

Various aqueous media may be suitably employed for dispersing and suspending the tumorous tissue. Water, saline solutions, and various other mediums may be used. It is preferred that a 10%–25% suspension of tissue in about 0.15 M potassium citrate buffer, having a pH of about 7.0 be employed. An especially preferred medium for suspending the Rous sarcoma virus-induced tissue comprises sterile normal saline containing 2% rabbit serum plus antibiotics such as penicillin and streptomycin.

The tumorous tissue suspended in the fluid medium is mechanically disintegrated or comminuted to prepare a suspension or emulsion. It is preferred that the tissue be finely enough subdivided so as to pass through a 20-gauge needle. Various well-known techniques and equipment for shearing, chopping or grinding of the tissue are suitably used.

Potency of the preparation may be enhanced by subjecting the dispersed tissue pulp to enzyme digestion or mechanical cell rupture. Mechanical methods include homogenization and freeze-thaw techniques. If enzyme digestion is preferred, an enzyme such as hyaluronidase may be utilized. The pulp should be exposed to digestion, preferably in combination with mechanical homogenization, to cause at least partial rupture of a substantial amount of cells in the tissue pulp in the fluid medium. A level of 10 mg. of hyaluronidase per 100 ml. of tissue pulp, in combination with mechanical homogenization by a device such as a Virtis-45 homogenizer, yields a desirable disintegrated pulp suspension. Subjecting the pulp to freezing temperatures followed by thawing is an alternative method which will rupture a substantial amount of the pulp cells. In many cases it is desirable to repeat the freeze-thaw cycle until optimal disintegration is achieved.

Following comminution the pulp in the fluid medium is separated as by gravity settling or centrifugation to allow sedimentation of the tissue pulp. Ordinarily centrifugation is the preferred method of achieving rapid separation. A force of about 3000 g. for about five to thirty minutes will cause satisfactory separation. The supernatant is collected for inactivation.

Inactivation is defined as treatment that renders the virus contained in the fluid medium non-infective and incapable of producing disease symptoms, but which does not interfere with antigenicity of the virus. The preferred methods of inactivation include treatment with chemical reagents, heating and mechanical means. Chemical agents which may be used to inactivate the virus include ether, alcohols, phenol, hydrogen peroxide and $\beta$-propiolactone. Heating, ultraviolet light, ultrasonic sound and other methods known to the prior art may also be employed.

It is preferred that the supernatant be inactivated by the use of formalin, at a concentration of about one volume of formalin in from about 500–10,000 volumes supernatant. The formalin-containing supernatant should be maintained at a temperature below about 65° C. during this inactivation period. Formalin inactivation is a function of reagent concentration, time and temperature. At temperatures of from 0°–10° C. about ten days is normally required. At a moderate concentration of Formalin a temperature of about 25°–37° C. for 48 hours is generally suitable.

Although it is not necessary, and in some cases is not desirable, adjuvants may be incorporated into the inactivated supernatant to enhance their basic potency. Adjuvants such as Freund's adjuvant, vegetable gums such as alginates, and hexadecylamine may be employed. It is preferred that about a 0.5% sodium alginate level be used in the supernatant to form a more stable emulsion.

It has been found that repeated oral doses, inoculations and like methods of administration of the avian leukosis vaccine often result in higher infectivity titers. It is preferred that birds be inoculated at intervals of at least seven days until immunity is achieved. Increased vaccine concentrations may often be used to obviate the disadvantages of repeated inoculations if desired.

The following detailed examples are presented to more fully illustrate various embodiments of the disclosed invention.

EXAMPLE I

Eight-day-old chickens are inoculated ten times, eight times with 0.2 ml. intramuscularly and two times with 0.2 ml. in the wing web. The first six vaccinations are with a vaccine prepared by making a 10% suspension of Rous sarcoma tumor tissue in medium 199 after treatment with 10 mg. of hyaluronidase per 100 ml. Medium 199 is a general purpose synthetic medium, widely used for tissue culture. Its formula may be found, among other places, in Proc. Soc. Exptl. Biol. and Med., 1950, 73 (1):6.

This suspension is centrifuged at 2000 r.p.m. for thirty minutes. The supernatant is inactivated with 1:1000 Formalin at room temperature for three days. The last four vaccinations are with a purified Rous sarcoma virus inactivated by 1:1000 Formalin for three days at room temperature. The birds are challenged in the wing web with 0.2 ml. of a $10^{-2}$ dilution of Rous sarcoma virus three days after the last vaccination.

All birds are sacrificed 23 days post challenge and tumors excised and weighed.

TABLE A

| No. of Birds | Total Tumor Wt. of Group, gm. | Average Tumor Wt./Bird, gm. | No. Without Tumors |
|---|---|---|---|
| 25 vaccinated | 54.2 | 2.17 | 9 |
| 11 controls | 74.5 | 6.77 | 2 |

There is a 67.9% reduction in the average tumor weight of the vaccinated birds compared to the controls. Also, there is a larger number of vaccinated birds without tumors.

EXAMPLE II

A 20% suspension of Rous sarcoma-induced tumors is made with 0.15 M potassium citrate buffer (pH 7.0) containing 10 mg. of hyaluronidase per 100 ml. The suspension is homogenized in a Waring Blendor and centrifuged two times at 2000 r.p.m. at 4° C. The supernatant is inactivated with 1:2000 Formalin at 4° C. for ten days. Sodium alginate (0.5%) or hexadecylamine (5 mg./ml.) is added to aliquots. Groups consisting of 20 three-week-old birds are vaccinated as follows: 1 time, 1.0 ml. I.M. (intramuscularly); 2 times, 1.0 ml. I.M. and 0.2 ml. in the wing web; 3 times, 1.0 ml. I.M., 1.0 ml. I.M. and 0.2 ml. in the wing web. The time interval between the first and second vaccination is one week and two weeks between the second and third vaccination. The birds are challenged three weeks after the last vaccination with either 100 $TID_{50}$ (tumor-inducing doses) or 1000 $TID_{50}$.

The birds are sacrificed two weeks post challenge and tumors excised and weighed. Results are summarized in the the following table:

TABLE B

| Times Vaccinated | Sodium Alginate | | Hexadecylamine | | Vaccine—No Adjuvant | | Controls | |
|---|---|---|---|---|---|---|---|---|
| | 1,000 $TID_{50}$, gm. | 100 $TID_{50}$, gm. | 1,000 $TID_{50}$, gm. | 100 $TID_{50}$, gm. | 1,000 $TID_{50}$, gm. | 100 $TID_{50}$, gm. | 1,000 $TID_{50}$, gm. | 100 $TID_{50}$, gm. |
| 1 | 1.0 | 1.0 | 13.2 | (*) | 3.7 | 0.8 | | |
| 2 | 0 | 0 | (*) | 2.0 | 0 | 0 | 15.7 | 3.4 |
| 3 | 0 | 0 | 0 | 0 | 0 | 1.0 | (*) | 4.2 |

*All birds in group died during the experiment.
Gram Weight=average tumor weight.

Birds vaccinated two or three times with or without adjuvant exhibit considerable protection to challenge compared to the controls.

EXAMPLE III

A 20% suspension of Rous sarcoma virus which induces tumors in sterile, normal saline containing 2.0% rabbit serum and 100 units of penicillin and 100 mg. of streptomycin per ml. is quick frozen and thawed three times to rupture virus-containing cells. The suspension is centrifuged at 2000 r.p.m. at 4° C. for twenty minutes. The supernatant is inactivated with either 1:2000 or 1:4000 formalin at 37° C. for 48 hours. Another aliquot is inactivated with 1:2000 formalin at 4° C. for nine days plus one day at 25° C. Prior to inactivation the vaccine had an infectivity titer of about $10^{-3}$. Groups of three-week-old chickens, ten birds per group, are inoculated intramuscularly either once, twice or three times at two-week intervals with the vaccine with or without Freund's complete adjuvant and challenged with 100 $TID_{50}$ three weeks after the last vaccination. Results appear in Table C.

TABLE C
[Percent protection]

| | 1:2,000 Formalin, 48 hrs. at 37° C., percent | 1:4,000 Formalin, 48 hrs. at 37° C., percent | 1:2,000 Formalin, 9 days at 4° C., 1 day at 25° C., percent | Controls |
|---|---|---|---|---|
| Without Adjuvant: | | | | |
| 1 time | 20 | 40 | 10 | 0 |
| 2 times | 50 | 60 | 80 | 0 |
| 3 times | 100 | 90 | [1] 90 | 0 |
| With Adjuvant: | | | | |
| 1 time | 10 | 33 | 33 | 0 |
| 2 times | 50 | 60 | 50 | 0 |
| 3 times | 80 | 100 | [2] 60 | 0 |

[1] 7 birds had tumors at site of vaccination.
[2] 1 bird had a tumor at site of vaccination apparently due to incomplete inactivation of Rous Sarcoma virus.

Apparently Freund's complete adjuvant has no enhancement effect as far as protection is concerned. This may be due to the poor stability of the emulsion of vaccine and adjuvant. One vaccination provides little protection, two vaccinations provide about 50% protection, whereas three vaccinations provide between 80% and 100% protection against a challenge of Rous sarcoma virus.

EXAMPLE IV

A 25% suspension of Rous sarcoma virus-induced tumor tissue in 0.15 M potassium citrate buffer (pH 7.0) containing hyaluronidase is allowed to digest for one hour at room temperature with slow mixing in a Waring Blendor. The suspension is frozen at −70° C. overnight. After thawing, the suspension is homogenized with a Virtis-45 and centrifuged twice at 2000 r.p.m. for ten minutes. The supernatant is inactivated with 1:2000 formalin at 4° C. for nine days plus one day at 25° C. After inactivation, 0.5% sodium alignate adjuvant is added. Four hundred eight three-month-old chickens were vaccinated three times with a time interval of two weeks between the first and second vaccination and fourteen weeks between the second and third vaccination. The first vaccination consists of 1.0 ml. I.M., the second 0.25 ml. in the wing web and the third 1.0 ml. I.M. An equal number of birds serve as controls.

Over a twelve-month period the birds that die are necropsied and the incidence of leukosis recorded

TABLE D

|  | Vaccinated | | Controls | |
|---|---|---|---|---|
|  | Mortality | Leukosis | Mortality | Leukosis |
| No. Birds | 116 | 18 | 119 | 42 |
| Percent Mortality | 28.4 |  | 29.1 |  |
| Percent Leukosis in dead birds to total flock | 4.4 |  | 10.3 |  |
| Percent Leukosis in dead birds | 15.5 |  | 35.3 |  |

There is considerable protection in the vaccinated birds against leukosis compared to the controls both in the percentage of leukosis in the entire flock and in birds that died.

EXAMPLE V

Eggs are collected from the vaccinated flock of Example IV, two weeks after the last vaccination (first progeny) and also six weeks after the last vaccination (second progeny) in order to determine if the transmission of maternal antibodies would prevent leukosis in the progeny.

The birds of progeny 1 and 2 are observed for a period of nine months after hatching, dead birds being necropsied and the incidence of leukosis recorded.

TABLE E

|  | First Progeny | | Second Progeny | |
|---|---|---|---|---|
|  | Controls | Vaccinated | Controls | Vaccinated |
| No. of Birds | 182 | 227 | 271 | 244 |
| Mortality No. | 80 | 89 | 140 | 136 |
| Percent Mortality | 43.2 | 39.2 | 50.4 | 54.5 |
| No. dead with leukosis | 30 | 20 | 62 | 41 |
| Percent Leukosis in dead birds | 37.5 | 22.4 | 44.2 | 30.1 |
| Percent Leukosis in dead birds to total flock | 16.4 | 8.8 | 22.9 | 16.8 |

This indicates that it is possible to protect progeny against leukosis by inoculating the dams with the Rous sarcoma vaccine.

*Example VI*

Three hundred three-to-four-week-old chickens are inoculated intramuscularly with 2.0 ml. of a Rous sarcoma vaccine three times at two-week intervals. An equal number of birds serve as unvaccinated controls. The vaccine is prepared by making a 20% suspension of Rous sarcoma virus-induced tumor tissue with 0.15 M potassium phosphate buffer (pH 7.0) containing 2.0% rabbit serum with 100 units of penicillin and 100 mg. of streptomycin per ml. The suspension is quick frozen and thawed three times and centrifuged at 2000 r.p.m. for twenty minutes at 4° C. The supernatant is inactivated with 1:2000 Formalin for nine days at 4° C. plus one day at 25° C. Equal parts of Freund's incomplete adjuvant are added. The infectivity titer of the vaccine prior to inactivation is about $10^{-2}$.

To illustrate the effectiveness of the present invention in the control of avian leukosis in contrast with the use of RPL 12 tumorous tissue, reference can be made to the publication "The Immunological Response of Chickens After Treatment With Several Vaccines of Visceral Lymphomatosis," Burmester et al., Poultry Science, vol. 36, pp. 79–87. To summarize, the noted publication reports the extent of immunity obtained as determined by the relative responses of chickens hatched of eggs laid before, and of chickens hatched of eggs laid after, the dams had received a series of immunization injections of RPL 12 tumorous tissue. Chick challenge tests were then undertaken and an estimate of the relative resistance of the progeny was made based on the response following intraperitoneal inoculation (lymphomatous liver tissue—RPL 12) when the chicks were one day of age. A post mortem examination was made of all birds that died, and a diagnosis, positive or negative to the various forms of lymphomatosis, was rendered. All vaccines, with one exception, were from a single preparation of lymphomatous liver filtrate, identified as L 25. The procedures which were employed for the immunization of the various lots of hens were as follows:

*Lot 1.*—Preparation L 25 was given without further alteration in a series of six injections. The first four injections were given every seventh day, and the last two were given at 14-day intervals. The first injection was 0.4 ml. given intravenously and all others were 2.0 ml. given intraperitoneally.

*Lot 2.*—Preparation L 25 was given without further alteration in a series of four intramuscular injections of 2 ml. at 3-week intervals.

*Lot 3.*—Preparation L 25 was treated by adding beta-propiolactone to make a concentration of 0.025 percent by volume, and then incubating for two hours at 37° C. This material was given for the first intramuscular injection of 2.0 ml. The remaining 3 injections were with untreated L 25, with route, amount, and intervals the same as for Lot 2.

*Lot 4.*—Beta-propiolactone treated L 25 was given for all 4 of the intramuscular injections with volumes and intervals the same as for Lot 2.

*Lot 5.*—Preparation L 25 was treated by adding Formalin to make a concentration of 0.2 percent by volume and holding it at 2° C. for 5 days. The number, volume, route, and time interval of injections were the same as for Lot 2.

*Lot 6.*—Preparation L 25 was treated by placing tubes of it in a water bath at 56° C. for 30 minutes. The number, volume, route, and time interval of injection were the same as for Lot 2.

*Lot 7.*—Untreated preparation L 25 was mixed with an equal volume of an adjuvant. Each bird received 4 ml. of the mixture intramuscularly, in each of 2 injections given with a 4-week interval. The adjuvant was made up of 1 part Aracel A[1] and 9 parts Bayol F[2].

*Lot 8.*—The source of virus for the vaccine used on this lot was preparation L 20. It was similar in its origin and preparation to L 25 except that, in addition, the filtered extract was passed through a Sharples centrifuge. The centrifuge was operated at a speed that resulted in an R.C.F. of $60,000 \times g$ and with a liquid flow of 7–10 ml. per minute. The sediment was resuspended in a volume of Simms salt solution one-eightieth of the original volume. The suspension was clarified by centrifugation at an R.C.F. of 1,000×g for 15 minutes. The supernatant was transferred to ampules, sealed, frozen, and stored in a $CO_2$ box. The L 20 virus preparation was administered with the same adjuvant and procedure used for Lot 7.

Lot 9.—Hens of this lot were not treated in any way, and were considered the non-vaccinated controls.

The responses following challenge inoculation of the progeny of the various lot of hens are presented in Table 1.

between 80% and 100% protection against a challenge of Rous sarcoma virus.

While in the foregoing specification various embodiments of the invention have been given in detail, no unnecessary limitation should be understood therefrom as it will be appreciated by those skilled in the art that various modifications may be resorted to without departing from the spirit and scope of the invention.

We claim:

The method of treating poultry to provide immunization against the Avian Leukosis Complex, which method

TABLE 1

[Percentage of visceral lymphomatosis after inoculation in the progeny of various lots of hens before and after treatment with certain preparations]

| Lot No. | Immunizing preparation and procedure | Period* | Dose log, 2.5 | | | | Dose log, 4.5 | | | | Dose log, 6.5 | | | |
|---|---|---|---|---|---|---|---|---|---|---|---|---|---|---|
| | | | Total No. | Percent visc. lympho at— | | | Total No. | Percent visc. lympho at— | | | Total No. | Percent visc. lympho a t— | | |
| | | | | 112 da. | 140 da. | 196 da. | | 112 da. | 140 da. | 196 da. | | 112 da. | 140 da. | 196 da. |
| 1 | L 25 i.p., 6X | B | 57 | 71.9 | 77.1 | 80.7 | 57 | 17.5 | 21.0 | 29.8 | 53 | 9.4 | 11.3 | 17.0 |
| | | A | 59 | 22.0 | 23.7 | 27.1 | 59 | 1.7 | 1.7 | 1.7 | | | | |
| 2 | L 25 i.m., 4X | B | 47 | 57.4 | 59.5 | 63.8 | 58 | 18.9 | 24.1 | 32.7 | 59 | 3.4 | 5.1 | 10.1 |
| | | A | 58 | 18.9 | 18.9 | 22.4 | 57 | 3.5 | 7.0 | 8.7 | | | | |
| 3 | L 25 β-propiolactone then L 25 alone, i.m., 4X | B | 51 | 54.9 | 56.8 | 60.7 | 52 | 21.1 | 23.0 | 30.7 | 50 | 0 | 10.0 | 16.0 |
| | | A | 57 | 19.3 | 22.8 | 31.5 | 55 | 5.5 | 7.2 | 7.3 | | | | |
| 4 | L 25 β-propiolactone, i.m., 4X | B | 58 | 70.6 | 74.1 | 74.1 | 55 | 40.0 | 41.8 | 47.2 | 56 | 8.9 | 12.5 | 21.4 |
| | | A | 57 | 36.8 | 42.1 | 43.8 | 51 | 7.8 | 15.7 | 17.6 | | | | |
| 5 | L 25 formalin, i.m., 4X | B | 60 | 58.3 | 58.3 | 60.0 | 56 | 21.4 | 25.0 | 33.9 | 59 | 5.0 | 10.1 | 15.2 |
| | | A | 57 | 29.8 | 31.6 | 35.0 | 61 | 3.3 | 4.9 | 6.5 | | | | |
| 6 | L 25 heated 56° i.m., 4X | B | 56 | 67.8 | 73.2 | 75.0 | 59 | 23.7 | 27.1 | 35.5 | 58 | 6.8 | 6.8 | 15.5 |
| | | A | 57 | 61.4 | 64.9 | 66.6 | 62 | 22.6 | 22.6 | 27.4 | | | | |
| 7 | L 25 adjuvant i.m., 2X | B | 55 | 67.2 | 69.0 | 69.0 | 51 | 19.6 | 19.6 | 29.4 | 51 | 7.8 | 9.8 | 19.6 |
| | | A | 59 | 16.9 | 20.3 | 20.3 | 48 | 0.0 | 2.1 | 2.1 | | | | |
| 8 | L 20 adjuvant i.m., 2X | B | 48 | 72.9 | 75.0 | 79.1 | 53 | 39.6 | 47.2 | 58.5 | 51 | 3.9 | 11.7 | 35.3 |
| | | A | 60 | 25.0 | 30.0 | 31.6 | 53 | 11.3 | 11.3 | 15.1 | | | | |
| 9 | Untreated controls | B | 63 | 61.9 | 61.9 | 66.6 | 57 | 28.1 | 33.3 | 38.6 | 63 | 3.1 | 9.5 | 15.8 |
| | | A | 64 | 65.7 | 68.7 | 68.7 | 67 | 37.3 | 41.8 | 43.3 | | | | |
| | Non-inoculated controls | B | 118 | 0 | 0.9 | 1.8 | | | | | | | | |
| | | A | 61 | 0 | 0 | 1.7 | | | | | | | | |

*Chicks hatched of eggs laid during the 2 periods before (B) and after (A) the immunization period.

A review of the results as presented in Table 1 shows that the visceral lymphomatosis that occurred 140 days after inoculation with the maximum dose (log—2.5) varied from a high of 77.1% (six immunizing injections) to a low of 56.8% (four immunizing injections) among the progeny obtained before immunization, whereas similar data for progeny obtained after the immunization period varied from a high of 64.9% (four immunizing injections) to a low of 18.9% (four immunizing injections). In terms of percent protection, subtracting the percent visceral lymphomatosis that occurred in progeny obtained after the immunization period from the percent visceral lymphomatosis that occurred in progeny obtained before immunization, it can be seen that with respect to the above-noted data, the percent protection varied from 8.3% to 40.6%. In contrast, with the present invention it was found (Table C) that three vaccinations provided comprises repeatedly administering to leukosis-susceptible poultry at time intervals of at least seven days a vaccine comprising inactivated Rous sarcoma virus in an essentially neutral aqueous fluid.

References Cited

Carr: Nature, vol. 155, p. 202, Feb. 17, 1945.

Darcell: Cancer Research, vol. 20, pp. 2–17, January 1960.

Fink et al.: U.S. National Cancer Institute Journal, vol. 26, pp. 519–522, February 1961.

Merchant et al.: Veterinary Bacteriology and Virology, 6th ed., published by Iowa State University Press, Ames, Iowa, 1961, pp. 766 and 767.

LEWIS GOTTS, *Primary Examiner.*

RICHARD L. HUFF, *Assistant Examiner.*